United States Patent
Yang et al.

(10) Patent No.: US 7,193,022 B2
(45) Date of Patent: Mar. 20, 2007

(54) METHOD OF POLYMERIZATION AND COPOLYMERIZATION OF ETHYLENE

(75) Inventors: Chun-Byung Yang, Daejon-shi (KR); Won-Young Kim, Daejon-shi (KR); Ho-Sik Chang, Daejon-shi (KR)

(73) Assignee: Samsung Total Petrochemicals Co., Ltd., Chungcheongnam Province (KR)

( * ) Notice: Subject to any disclaimer, the term of this patent is extended or adjusted under 35 U.S.C. 154(b) by 0 days.

(21) Appl. No.: 10/541,597

(22) PCT Filed: Jan. 16, 2004

(86) PCT No.: PCT/KR2004/000068

§ 371 (c)(1), (2), (4) Date: Mar. 29, 2006

(87) PCT Pub. No.: WO2004/065431

PCT Pub. Date: Aug. 5, 2004

(65) Prior Publication Data

US 2006/0149007 A1    Jul. 6, 2006

(30) Foreign Application Priority Data

Jan. 23, 2003   (KR) .................. 10-2003-0004522

(51) Int. Cl.
*C08F 4/626* (2006.01)
*C08F 4/629* (2006.01)
*C08F 10/02* (2006.01)

(52) U.S. Cl. .................. 526/125.3; 526/125.1; 526/125.2; 502/116; 502/123; 502/127; 502/128; 502/132

(58) Field of Classification Search ............. 502/115, 502/116, 127, 128, 132, 123; 526/125.1, 526/125.2, 125.3
See application file for complete search history.

(56) References Cited

U.S. PATENT DOCUMENTS

| | | | | |
|---|---|---|---|---|
| 4,657,998 A | * | 4/1987 | Malpass | 526/144 |
| 5,990,251 A | * | 11/1999 | Gelus | 526/125.7 |
| 6,762,145 B2 | * | 7/2004 | Yang et al. | 502/103 |
| 2004/0030077 A1 | * | 2/2004 | Yang et al. | 526/260 |

* cited by examiner

*Primary Examiner*—Caixia Lu
(74) *Attorney, Agent, or Firm*—Barlow, Josephs & Holmes, Ltd.

(57) ABSTRACT

Disclosed is a method of polymerization and copolymerization of ethylene, which is carried out in the presence of (a) a solid titanium complex catalyst prepared by the steps of (i) preparing a magnesium solution by contacting halogenated magnesium compounds with alcohol, (ii) reacting the magnesium solution with ester compound having at least one hydroxyl group and silicon compound having alkoxy group, (iii) preparing a solid titanium catalyst component by reacting mixture of titanium compound and haloalkane compound; and (iv) producing solid titanium complex catalyst by reacting the solid titanium catalyst component with mixture of aluminum compound and haloalkane compound, or with haloalkane; and (b) organometallic compounds in Group II or III of the Periodic Table.

14 Claims, No Drawings

METHOD OF POLYMERIZATION AND COPOLYMERIZATION OF ETHYLENE

TECHNICAL FIELD

The present invention relates to a method of polymerization or copolymerization of ethylene using a solid titanium catalyst obtained by treating a solid titanium catalyst component supported on a magnesium-containing carrier with haloalkane or with a mixture of aluminum compound and haloalkane.

BACKGROUND ART

It is known that a magnesium-containing catalyst for ethylene (co)polymerization shows significantly high catalytic activity, provides polymers with high bulk density, and is suitably used in liquid or gas phase polymerization. Liquid phase ethylene polymerization refers to a polymerization process carried out in solvent such as bulk ethylene, isopentane or hexane. The important features of catalyst used in such polymerization process, in view of its process applicability, are catalytic activity, bulk density of the resulting polymers, amount of low molecular weight polymers soluble in the medium, and the like. The molecular weight distribution in polymer varies depending on the properties of the catalyst per se and preparation conditions. For example, polymers obtained by using a Ziegler-Natta type catalyst in a single slurry or gas phase reactor generally have narrow molecular weight distribution. Owing to such feature of molecular structure, processability of the polymers is lowered and tensile strength and rigidity in a molten state is limited, thereby resulting in distortion and contraction of shape and Parrison deflection during processing. Moreover, these polymers are difficult to apply to the production of large caliber pipe or large blow molding products which require high mechanical resistance in a molten state. When raising the molecular weight of polymers produced, tensile strength is raised but processability is lowered, causing problems such as clefts and the like during processing. In order to overcome these problems, it is suggested to be an ideal method in view of molecular structure design to raise the molecular weight simultaneously with broadening the molecular weight distribution, since such method can maintain the tensile strength high and provide excellent processability.

Various titanium-based catalysts containing magnesium for olefin polymerization and various methods for producing them have been reported. In particular, a method using a magnesium solution to obtain an olefin polymerization catalyst which can provide polymers having high bulk density as mentioned above is widely known. With regard to this, a method for preparing a magnesium solution may be mentioned wherein magnesium compounds are reacted with an electron donor such as alcohol, amine, cyclic ether, or organic carboxylic acid in the presence of a hydrocarbon solvent. Methods using alcohol to prepare a magnesium solution are disclosed in U.S. Pat. Nos. 3,642,746, 4,336,360, 4,330,649 and 5,106,807. Well known is a preparation method for a magnesium supported catalyst in which the liquid magnesium solution is reacted with halogen compounds such as titanium tetrachloride. Although these catalysts may produce polymers having high bulk density, the catalysts need to be improved in catalytic activity and hydrogen reactivity. U.S. Pat. Nos. 4,477,639 and 4,518,706 disclose a method wherein tetrahydrofuran, a kind of cyclic ether, is used as a solvent for dissolving the magnesium compounds.

In addition, U.S. Pat. Nos. 4,847,227, 4,816,433, 4,829,037, 4,970,186 and 5,130,284 have reported a preparation method of olefin polymerization catalysts which have good catalytic activity and can provide resulting polymers having enhanced bulk density, by reacting electron donors such as dialkylphthalate or phthaloyl chloride with a titanium chloride compound.

U.S. Pat. No. 5,459,116 has reported a preparation method for a supported titanium solid catalyst by contacting a titanium compound with a magnesium solution containing esters having at least one hydroxyl group as an electron donor. By this method, it is possible to obtain a catalyst which has high catalytic activity and can provide resulting polymers having high bulk density, but it still has to be improved in terms of molecular weight distribution.

U.S. Pat. No. 3,899,477 discloses a catalyst for which titanium halide, vanadium halide and organoaluminum compounds are used together. When treating this catalyst with alkylaluminum sesquiethoxide and trialkylaluminum before polymerization, it is possible to produce polymers having broad molecular weight distribution. This prior art, however, is disadvantageous in that the catalyst preparation process is complicated and it is difficult to control the condition of polymerization process due to the differences in hydrogen reactivity between titanium and vanadium, and in reactivity to monomers and co-monomers.

As it has been shown above, for a conventional Ziegler-Natta type catalyst, it is difficult to have high catalytic activity and control the molecular weight distribution of resulting polymers. However, there is still a demand for a method for controlling the molecular weight distribution, in order to further control the processability and properties of ethylene polymers and extend their use.

The applicant of the present invention, therefore intends to propose a novel method for ethylene (co)polymerization with high catalytic activity and being able to control the molecular weight distribution.

DISCLOSURE OF THE INVENTION

The object of the present invention is to provide a method for (co)polymerization of ethylene which can enhance the catalytic activity, and control the molecular weight distribution of the polymer.

In order to achieve the said purposes, the method for (co)polymerization of ethylene according to the present invention is characterized in that the (co)polymerization of ethylene is carried out in the presence of (a) and (b) as defined below:

(a) a solid titanium complex catalyst prepared by a method comprising the steps of:
  (i) preparing a magnesium solution by contacting halogenated magnesium compounds with alcohol;
  (ii) reacting the magnesium solution with ester compound having at least one hydroxyl group and silicon compound having alkoxy group;
  (iii) preparing a solid titanium catalyst component by reacting the product from step (ii) with a mixture of titanium compound and haloalkane compound; and
  (iv) producing a solid titanium complex catalyst by reacting the solid titanium catalyst component with a mixture of aluminum compound and haloalkane compound, or with haloalkane, (b) organometallic compounds in Group II or III of the Periodic Table.

The solid titanium complex catalyst (a), which may be used in the method for (co)polymerization of ethylene according to the invention, is prepared by a method further comprising a step of reacting the solid titanium catalyst component obtained from the step (iii) with an additional titanium compound at least once before the step (iv).

The halogenated magnesium compounds which may be used in the present invention includes, but not limited to, magnesium dihalides such as magnesium chloride, magnesium iodide, magnesium fluoride and magnesium bromide; alkyl magnesium halides such as methyl magnesium halide, ethyl magnesium halide, propyl magnesium halide, butyl magnesium halide, isobutyl magnesium halide, hexyl magnesium halide and amyl magnesium halide; alkoxy magnesium halides such as methoxy magnesium halide, ethoxy magnesium halide, isopropoxy magnesium halide, butoxy magnesium halide and octoxy magnesium halide; and aryloxy magnesium halides such as phenoxy magnesium halide and methylphenoxy magnesium halide. These magnesium compounds may be used alone or in the mixture of two or more of above compounds. Further, the above magnesium compounds can effectively be used in the form of a complex compound with other metals.

The above-listed magnesium compounds can be simply represented by a general formula, however, in some cases, magnesium compounds cannot be represented simply by a formula depending on the preparation method of magnesium compounds. In these cases, they can be generally regarded as a mixture of magnesium compounds as listed above. For example, the following compounds may be used in the present invention as a magnesium compound: those obtained by reacting magnesium compounds with polysiloxane compound, halogen-containing silane compound, ester, or alcohol; and those obtained by reacting magnesium metal with alcohol, phenol or ether in the presence of halosilane, phosphorus pentachloride, or thionyl chloride. Preferred are magnesium halides, in particular magnesium chloride or alkyl magnesium chloride, preferably having an alkyl group of 1 to 10 carbon atoms, alkoxy magnesium chloride, preferably having an alkoxy group of 1 to 10 carbon atoms, and aryloxy magnesium chloride, preferably having an aryloxy group of 6 to 20 carbon atoms.

The magnesium solution used in the present invention may be prepared as a solution by dissolving the magnesium compound into an alcohol in the presence or absence of a hydrocarbon solvent. Hydrocarbon solvents which may be used in the present invention include, but not limited to, aliphatic hydrocarbons such as pentane, hexane, heptane, octane, decane and kerosene; alicyclic hydrocarbons such as cyclopentane, methylcyclopentane, cyclohexane and methylcyclohexane; aromatic hydrocarbons such as benzene, toluene, xylene, ethylbenzene, cumene and cymene; and halogenated hydrocarbons such as dichloropropane, dichloroethylene, trichloroethylene, carbon tetrachloride and chlorobenzene.

The preparation of a magnesium solution from a magnesium compound may be carried out using alcohol in the presence of a hydrocarbon solvent mentioned above. Alcohols which may be used in the present invention include, but not limited to, alcohols containing 1 to 20 carbon atoms, such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl alcohol, and preferably alcohols containing 1 to 12 carbon atoms. Even though the average size and particle size distribution of the catalyst desired may depend on the type and the total amount of alcohol used, the type of magnesium compound used, and the molar ratio of alcohol to magnesium compound, the total amount of alcohol used to obtain the magnesium solution is at least 0.5 mol, preferably about 1.0–20 mol, or more preferably about 2.0–10 mol per one mol of the magnesium compound.

The reaction of the magnesium compound and alcohol in preparation of a magnesium solution may be preferably carried out in hydrocarbon medium. The reaction may be carried out at the temperature of, though it may vary depending on the type and amount of alcohol used, at least about −25° C., preferably about −10–200° C., or more preferably about 0–150° C. for about 15 minutes to 5 hours, or preferably about 30 minutes to 4 hours.

As one type of electron donor used in the present invention, the ester compound having at least one hydroxyl group can be selected from the group consisting of: unsaturated fatty acid esters having at least one hydroxyl group such as 2-hydroxy ethyl acrylate, 2-hydroxy ethyl methacrylate, 2-hydroxy propyl acrylate, 2-hydroxy propyl methacrylate, 4-hydroxy butyl acrylate, and pentaerythritol triacrylate; aliphatic mono- or polyesters having at least one hydroxyl group such as 2-hydroxy ethyl acetate, methyl-3-hydroxy butylate, ethyl-3-hydroxy butylate, methyl-2-hydroxy isobutylate, ethyl-2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy caproate, diethyl bis-(hydroxymethyl)malonate; aromatic esters having at least one hydroxyl group such as 2-hydroxy ethyl benzoate, 2-hydroxy ethyl salicylate, methyl 4-(hydroxymethyl)benzoate, methyl 4-hydroxy benzoate, ethyl 3-hydroxy benzoate, 4-methyl salicylate, ethyl salicylate, phenyl salicylate, propyl 4-hydroxy benzoate, phenyl 3-hydroxy naphthanoate, monoethylene glycol monobenzoate, diethylene glycol monobenzoate, triethylene glycol monobenzoate; alicyclic esters having at least one hydroxyl group such as hydroxy butyl lactone; and the like. The amount of ester compound having at least one hydroxyl group is 0.001 to 5 mol, preferably 0.01 to 2 mol, per one mol of the magnesium.

As another type of electron donor used in the present invention, the silicon compound having alkoxy group is preferably a compound represented by the general formula of $R_nSi(OR)_{4-n}$, wherein R is a hydrocarbon group having 1 to 12 carbon atoms, and n is an integer of 1 to 3. Specifically, the silicon compound having alkoxy group can be one or more compounds selected from the group consisting of dimethyl dimethoxy silane, dimethyl diethoxy silane, diphenyl dimethoxy silane, methyl phenyl methoxy silane, diphenyl diethoxy silane, ethyl trimethoxy silane, vinyl trimethoxy silane, methyl trimethoxy silane, phenyl trimethoxy silane, methyl triethoxy silane, ethyl triethoxy silane, vinyl triethoxy silane, butyl triethoxy silane, phenyl triethoxy silane, ethyl triisopropoxy silane, vinyl tributoxy silane, ethyl silicate, butyl silicate and methyl triaryloxy silane. The amount of the silicon compound having alkoxy group is preferably 0.05 to 3 mol, more preferably 0.1 to 2 mol, per one mol of the magnesium.

The reaction temperature at which the liquid magnesium compound solution contacts with the ester compound having at least one hydroxyl group and the silicone compound having alkoxy group, is suitably 0 to 100° C., or preferably 10 to 70° C.

The magnesium compound solution is further reacted with the mixture of a liquid titanium compound represented by a general formula of $Ti(OR)_a X_{4-a}$, wherein R is a hydrocarbon group, preferably alkyl group having 1 to 10 of carbon atoms; X is a halogen atom; and a is an integer of $0 \leq a \leq 4$, and a haloalkane compound to recrystallize the catalyst particles. The titanium compound which satisfies the above general formula includes, but not limited to, titanium tetrahalide such as $TiCl_4$, $TiBr_4$ and $TiI_4$; alkoxy titanium trihalide such as $Ti(OCH_3)Cl_3$, $Ti(OC_2H_5)Cl_3$, $Ti(OC_2H_5)Br_3$, and $Ti(O(i-C_4H_9))Br_3$; dialkoxy titanium dihalide such as $Ti(OCH_3)_2Cl_2$, $Ti(OC_2H_5)_2Cl_2$, $Ti(O(i-C_4H_9))_2Cl_2$, and $Ti(OC_2H_5)_2Br_2$; tetraalkoxy titanium such as $Ti(OCH_3)_4$, $Ti(OC_2H_5)_4$ and $Ti(OC_4H_9)_4$. Also, mixtures of the above titanium compounds can be used in the present invention. Preferred titanium compounds are halogen-containing titanium compounds, and more preferred is titanium tetrachloride.

The haloalkane compound which may be used in the present invention is a compound comprising at least one halogen atom and 1 to 20 carbon atoms, or mixtures thereof. For example, the haloalkane compound can be selected from, but not limited to, the group consisting of monochloromethane, dichloromethane, trichloromethane, tetrachloromethane, monochloroethane, 1,2-dichloroethane, monochloropropane, monochlorobutane, monochloro-sec-butane, monochloro-tert-butane, monochlorocyclohexane, chlorobenzene, monobromomethane, monobromopropane, monobromobutane, and monoiodomethane. Preferred are chloroalkane compounds.

The appropriate amount of the mixture of a titanium compound and a haloalkane compound used in recrystallization of the magnesium compound solution is 0.1–200 mol, preferably 0.1–100 mol, more preferably 0.2–80 mol, per one mol of the magnesium compound. The appropriate mixing molar ratio of the haloalkane compound to the titanium compound is 0.05–0.95, more preferably 0.1–0.8. The shape and the size of the solid components recrystallized vary greatly, depending on the reaction condition under which the magnesium compound solution is reacted with the mixture of a titanium compound and a haloalkane compound. Therefore, it is desirable to form the solid components by reacting the magnesium compound solution with the mixture of a titanium compound and a haloalkane compound at a sufficiently low temperature. It is advantageous to carry out the contact-reaction preferably at −70 to 70° C., more preferably at −50 to 50° C. After the contact-reaction, the reaction temperature is raised slowly and maintained at 50 to 150° C. for 0.5 to 5 hours so that the reaction can be sufficiently carried out.

The solid catalyst component obtained as described above may be further reacted with an additional titanium compound. In this case, it is advantageous to use titanium halides or alkoxy titanium halides with the alkoxy functional groups having 1 to 20 carbon atoms, or, in some cases, the mixtures thereof may be used. Preferred are titanium halides or alkoxy titanium halides with the alkoxy functional groups having 1 to 8 carbon atoms, more preferred are titanium tetrahalides.

The solid titanium catalyst component prepared as described above is treated with either the mixture of aluminum compound and haloalkane or haloalkane to give the final solid titanium catalyst.

The aluminum compound used in the present invention is preferably a compound represented by the general formula of $R_n AlX_{3-n}$, wherein R is alkyl group having 1 to 20 carbon atoms; X is halogen atom or hydride; and n is 1, 2 or 3. Particularly, trialkyl aluminums with the alkyl group having 1 to 20 carbon atoms such as triethyl aluminum and triisobutyl aluminum; organoaluminum compounds having one or more halogen atoms or hydride group such as ethyl aluminum dichloride, diethyl aluminum chloride, ethyl aluminum sesquichloride, diisobutyl aluminum hydride; or mixtures thereof can be used.

The haloalkane compound used in the present invention is a compound having at least one halogen atom and 1 to 20 carbon atoms, and the mixtures thereof are preferred. Particularly, monochloromethane, dichloromethane, trichloromethane, tetrachloromethane, monochloroethane, 1,2-dichloroethane, monochloropropane, monochlorobutane, monochloro-sec-butane, monochloro-tert-butane, monochlorocyclohexane, chlorobenzene, monobromomethane, monobromopropane, monobromobutane, monoiodomethane, and the like may be used and particularly preferred haloalkane compounds are chloroalkane compounds.

These aluminum and haloalkane compounds are preferably used in an amount of 0.05 to 500.0 mol, or more preferably 0.1 to 100.0 mol, per one mol of the titanium compound in the solid titanium catalyst component obtained from the step (iii). It is advantageous to carry out the reaction at the reaction temperature of, preferably −50 to 50° C., more preferably −20 to 30° C.

The method for (co)polymerization of ethylene according to the present invention is conducted by using a catalyst system comprising (a) a solid titanium catalyst prepared as described above and (b) organometallic compounds of Group II or III of the Periodic Table. Specifically, the catalyst (a) is useful for homopolymerization of ethylene as well as for copolymerization of ethylene with α-olefins having 3 or more carbon atoms such as propylene, 1-butene, 1-pentene, 4-methyl-1-pentene, and 1-hexene.

The organometallic compounds (b) useful in the present invention can be represented by the general formula of $MR_n$, wherein M is a metal component selected from Group II or IIIA such as magnesium, calcium, zinc, boron, aluminum, and gallium; R is an alkyl group having 1 to 20 carbon atoms such as methyl, ethyl, butyl, hexyl, octyl, and decyl; and n is the valence of the selected metal component. Preferred organometallic compounds are trialkyl aluminums with alkyl group having 1 to 6 carbon atoms such as triethyl aluminum and triisobutyl aluminum, and mixtures thereof. In some embodiments, organoaluminum compounds having at least one halogen atom or hydride group such as ethyl aluminum dichloride, diethyl aluminum chloride, ethyl aluminum sesquichloride and diisobutyl aluminum hydride can be used.

The polymerization reaction can carried out by gas phase polymerization or bulk polymerization in the absence of an organic solvent, or by liquid slurry polymerization in the presence of an organic solvent. These polymerizations are carried out in the absence of oxygen, water and other compounds that may act as a catalyst poison. In the case of liquid slurry polymerization, the concentration of the solid titanium complex catalyst (a) in the polymerization reaction system is about 0.001 to 5 mmol, preferably 0.001 to 0.5 mmol of the titanium atom in the catalyst, per one liter of solvent. As for a solvent, the following compounds or their mixtures can be useful: alkanes or cycloalkanes such as pentane, hexane, heptane, n-octane, isooctane, cyclohexane and methylcyclohexane; alkylaromatic compounds such as toluene, xylene, ethylbenzene, isopropylbenzene, ethyltoluene, n-propylbenzene and diethylbenzene; and halogenated aromatic compounds such as chlorobenzene, chloronaphthalene and ortho-dichlorobenzene. In the case of gas phase polymerization, the amount of the solid titanium complex catalyst (a) is about 0.001 to 5 mmol, preferably about 0.001 to 1.0 mmol, more preferably about 0.01 to 0.5 mmol of the titanium atom in the catalyst, per one liter of the polymerization reaction volume. The preferable concentration of the organometallic compounds (b) is about 1 to 2,000 mol, more preferably about 5 to 500 mol of aluminum atom, per one mol of the titanium atom in the catalyst (a).

To obtain a high reaction rate of polymerization, the polymerization reaction may be carried out at a sufficiently high temperature, regardless of the polymerization process. In general, the appropriate temperature is about 20 to 200° C., more preferably about 20 to 95° C. The appropriate pressure of monomers during polymerization is atmospheric pressure to 100 atm, more preferably 2 to 50 atm.

The molecular weight in the present invention is represented as Melt Index (MI, 2.16 kg) according to ASTM D 1238 which is typically known in this field of the art. In general, the lower the molecular weights are, the greater the MI is indicated. The molecular weight distribution of polymers in the present invention is represented as MFRR (MI, 21.6 kg/2.16 kg), determining method and meaning of which are well known in the art.

The resulting product by the polymerization method according to the present invention is homopolymer of ethylene or copolymer of ethylene with α-olefin in solid form, and is produced in a sufficiently high yield that the catalyst residue may not need to be removed, and has excellent bulk density and flowability.

BEST MODE FOR CARRYING OUT THE INVENTION

The following examples illustrate the present invention in detail. They only exemplify the present invention, however, by no means limitative of the scope the present invention.

EXAMPLE 1

Preparation of a Solid Titanium Complex Catalyst

A solid titanium complex catalyst component was prepared through a series of steps (i) to (iv) as follows:

(i) Preparation of a Magnesium Solution

Into an 1.0 L volume reactor equipped with a mechanical stirrer and replaced with nitrogen atmosphere, 19.0 g of $MgCl_2$ and 400 ml of heptane were introduced and the mixture was stirred at 700 rpm. To the mixture, 120 ml of 2-ethyl hexanol was added, then the reaction temperature was raised to 120° C. and the reaction was carried out for 3 hours. The homogeneous solution obtained after the reaction was cooled to room temperature (25° C.).

(ii) Contact Reaction of the Magnesium Solution with Ester Having a Hydroxyl Group and Alkoxy Silane Compound To the magnesium compound solution prepared in step (i) which is cooled to the room temperature, 2.4 ml of 2-hydroxyethyl methacrylate and 10.0 ml of ethyl silicate were added, and the reaction was carried out for 1 hour.

(iii) Treatment with a Mixture of Titanium Compound and Haloalkane Compound and Reaction with Additional Titanium Compound The solution prepared in step (ii) was adjusted to 10° C., and a mixed solution of 50 ml of titanium tetrachloride and 50 ml of trichloromethane was added dropwise thereto over 30 minutes. After completing the dropwise addition, the temperature of the reactor was raised to 80° C. over 1 hour, then 150 ml of titanium tetrachloride was added thereto and the mixture was maintained at this temperature for 2 hours. After the reaction, the reactor was cooled to the room temperature and washed with 400 ml of hexane until the unreacted free titanium tetrachloride was completely removed. The titanium content of the prepared solid catalyst component was 5.2%.

(iv) Treatment with the Mixture of Aluminum Compound and Haloalkane Compounds

A portion of the prepared solid titanium catalyst component was added to 200 ml of hexane, in a concentration of 6 mmol/L in terms of the titanium atoms. The temperature of the hexane slurry of the solid titanium catalyst was lowered to 0° C., and 3.0 ml of 1 M diethyl aluminum chloride and 6.0 ml of 1 M ethylchloride were slowly added thereto with stirring. After completing the addition, the temperature of the solution was raised to 20° C., and stirred for 5 hours to treat the solid titanium catalyst component, then stored at −10° C.

Polymerization

A 2 L volume of high pressure reactor was assembled while hot, after being dried in an oven. By purging the reactor with nitrogen and evacuating the reactor alternatively three times, the reactor was set to under nitrogen atmosphere. Then, to the reactor, 1,000 ml of n-hexane was injected, and 3 mmol of triisobutyl aluminum and 0.03 mmol of the solid titanium complex catalyst in terms of titanium atom were injected, then 1,000 ml of hydrogen was injected. The temperature of the reactor was raised to 80° C. with stirring at 700 rpm and the pressure of ethylene was adjusted to 80 psi, then the polymerization was carried out for one hour. After the completion of the polymerization, the temperature of the reactor was lowered to room temperature, and excessive amount of ethanol solution was added to the polymerized matter. The polymers produced were separated and collected, and dried in a vacuum oven at 50° C. for at least six hours to obtain polyethylene as white powder.

The polymerization activity of the catalyst was calculated as the weight ratio of the polymers produced (kg) to catalysts used (g) (herein, kg polyethylene/g catalyst). The results of polymerization, together with MI (g/10 min.) and the molecular weight distribution (MFRR) of the polymers are shown in Table 1.

EXAMPLE 2

A catalyst was prepared in the same manner as in example 1 except that 3.0 ml of 1M diethyl aluminum chloride and 6.0 ml of 1 M trichloromethane were used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 3

A catalyst was prepared in the same manner as in example 1 except that 3.0 ml of 1M diethyl aluminum chloride and 6.0 ml of 1 M tetrachloromethane were used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 4

A catalyst was prepared in the same manner as in example 1 except that 3.0 ml of 1M ethyl aluminum sesquichloride and 6.0 ml of 1 M ethyl chloride were used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 5

A catalyst was prepared in the same manner as in example 1 except that 3.0 ml of 1 M ethyl aluminum sesquichloride and 6.0 ml of 1 M trichloromethane were used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 6

A catalyst was prepared in the same manner as in example 1 except that 3.0 ml of 1 M ethyl aluminum sesquichloride and 6.0 ml of 1 M tetrachloromethane were used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 7

A catalyst was prepared in the same manner as in example 1 except that 3.0 ml of 1 M ethyl aluminum sesquichloride and 1.8 ml of 1 M tetrachloromethane were used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 8

A catalyst was prepared in the same manner as in example 1 except that 3.0 ml of 1 M ethyl aluminum sesquichloride and 3.0 ml of 1 M tetrachloromethane were used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 9

A catalyst was prepared in the same manner as in example 1 except that 3.0 ml of 1 M ethyl chloride was used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 10

A catalyst was prepared in the same manner as in example 1 except that 3.0 ml of 1 M trichloromethane was used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

EXAMPLE 11

A catalyst was prepared in the same manner as in example 1 except that 3.0 ml of 1 M trichloromethane was used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

COMPARATIVE EXAMPLE 1

A catalyst was prepared in the same manner as in example 1 except that 3.0 ml of 1 M ethyl aluminum sesquichloride was used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

COMPARATIVE EXAMPLE 2

A catalyst was prepared in the same manner as in example 1 except that 6.0 ml of hexane was used instead of 3.0 ml of 1 M diethyl aluminum chloride and 6.0 ml of 1 M ethyl chloride in step (iv), treatment with the mixture of aluminum compound and haloalkane compounds. Polymerization was carried out in the same manner as in example 1 and the results are shown in Table 1.

TABLE 1

| Example No. | Activity (kg PE/g catalyst) | MI (g/10 min.) | Molecular weight distribution (MFRR) |
| --- | --- | --- | --- |
| 1 | 5.7 | 4.3 | 39.2 |
| 2 | 5.6 | 4.5 | 39.5 |
| 3 | 5.4 | 4.1 | 40.2 |
| 4 | 5.9 | 4.3 | 39.5 |
| 5 | 6.2 | 4.9 | 40.1 |
| 6 | 5.8 | 4.6 | 40.5 |
| 7 | 5.7 | 3.4 | 39.8 |
| 8 | 5.7 | 4.2 | 39.9 |
| 9 | 6.2 | 6.9 | 36.7 |
| 10 | 6.3 | 6.4 | 37.0 |
| 11 | 6.6 | 7.2 | 36.2 |
| Comparative 1 | 5.1 | 2.3 | 37.2 |
| Comparative 2 | 5.0 | 2.1 | 33.5 |

INDUSTRIAL APPLICABILITY

According to the present invention, provided is a method for (co)polymerization of ethylene which can improve the catalytic activity and control the molecular weight distribution.

What is claimed is:

1. A method for (co)polymerization of ethylene which is carried out in the presence of (a) and (b) below:
   (a) a solid titanium complex catalyst prepared by a method comprising the steps of:
      (i) preparing a magnesium solution by contacting halogenated magnesium compounds with alcohol;
      (ii) reacting the magnesium solution with ester compound having at least one hydroxyl group and silicon compound having alkoxy group;
      (iii) preparing a solid titanium catalyst component by reacting the product from step (ii) with a mixture of titanium compound and haloalkane compound; and
      (iv) producing a solid titanium complex catalyst by reacting the solid titanium catalyst component with a mixture of aluminum compound and haloalkane compound, or with haloalkane,
   (b) organometallic compounds in Group II or III of the Periodic Table.

2. The method for (co)polymerization of ethylene according to claim 1, wherein the solid titanium complex catalyst is prepared by a method further comprising a step of reacting the solid titanium catalyst component obtained from the step (iii) with an additional titanium compound at least once.

3. The method for (co)polymerization of ethylene according to claim 1, wherein the ester compound having at least one hydroxyl group is selected from the group consisting of unsaturated fatty acid esters having at least one hydroxyl group, aliphatic mono- or polyesters having at least one hydroxyl group, aromatic esters having at least one hydroxyl group and alicyclic esters having at least one hydroxyl group, and wherein the silicon compound having alkoxy group is a compound represented by the general formula of $R_n Si(OR)_{4-n}$, wherein R is a hydrocarbon group having 1 to 12 carbon atoms, and n is an integer of 1 to 3.

4. The method of (co)polymerization of ethylene according to claim 3, wherein the silicon compound having alkoxy group is selected from the group consisting of dimethyl dimethoxy silane, dimethyl diethoxy silane, diphenyl dimethoxy silane, methyl phenyl methoxy silane, diphenyl diethoxy silane, ethyl trimethoxy silane, vinyl trimethoxy silane, methyl trimethoxy silane, phenyl trimethoxy silane, methyl triethoxy silane, ethyl triethoxy silane, vinyl triethoxy silane, butyl triethoxy silane, phenyl triethoxy silane, ethyl triisopropoxy silane, vinyl tributoxy silane, ethyl silicate, butyl silicate and methyl triaryloxy silane.

5. The method of (co)polymerization of ethylene according to claim 1, wherein the titanium compound is represented by a general formula of $Ti(OR)_a X_{4-a}$, wherein R is a hydrocarbon group, X is a halogen atom and a is an integer of $0 \leq a \leq 4$, and wherein the haloalkane compound is a compound comprising at least one halogen atom and 1 to 20 carbon atoms, or mixtures thereof.

6. The method of (co)polymerization of ethylene according to claim 5, wherein the titanium compound is selected from the group consisting of $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_9))Br_3$, $Ti(OCH_3)_2Cl_2$, $Ti(OC_2H_5)_2Cl_2$, $Ti(O(i-C_4H_9))_2Cl_2$, $Ti(OC_2H_5)_2Br_2$, $Ti(OCH_3)_4$, $Ti(OC_2H_5)_4$ and $Ti(OC_4H_9)_4$, and wherein the haloalkane compound is selected from the group consisting of monochloromethane, dichloromethane, trichloromethane, tetrachloromethane, monochloroethane, 1,2-dichloroethane, monochloropropane, monochlorobutane, monochloro-sec-butane, monochloro-tert-butane, monochlorocyclohexane, monobromomethane, monobromopropane, monobromobutane and monoiodomethane.

7. The method of (co)polymerization according to claim 1, wherein the aluminum compound is a compound represented by the general formula of $R_n AlX_{3-n}$, wherein R is alkyl group having 1 to 20 carbon atoms, X is halogen atom or hydride, and n is 1, 2 or 3, or mixtures thereof.

8. The method of (co)polymerization according to claim 1, wherein the organometallic compounds in Group II or III of the Periodic Table are represented by the general formula of $MR_n$, wherein M is a metal component selected from the group consisting of magnesium, calcium, zinc, boron, aluminum and gallium, R is an alkyl group having 1 to 20 carbon atoms; and n is the valence of the metal component.

9. The method for (co)polymerization of ethylene according to claim 2, wherein the ester compound having at least one hydroxyl group is selected from the group consisting of unsaturated fatty acid esters having at least one hydroxyl group, aliphatic mono- or polyesters having at least one hydroxyl group, aromatic esters having at least one hydroxyl group and alicyclic esters having at least one hydroxyl group, and wherein the silicon compound having alkoxy group is a compound represented by the general formula of $R_n Si(OR)_{4-n}$, wherein R is a hydrocarbon group having 1 to 12 carbon atoms, and n is an integer of 1 to 3.

10. The method of (co)polymerization of ethylene according to claim 9, wherein the silicon compound having alkoxy group is selected from the group consisting of dimethyl dimethoxy silane, dimethyl diethoxy silane, diphenyl dimethoxy silane, methyl phenyl methoxy silane, diphenyl diethoxy silane, ethyl trimethoxy silane, vinyl trimethoxy silane, methyl trimethoxy silane, phenyl trimethoxy silane, methyl triethoxy silane, ethyl triethoxy silane, vinyl triethoxy silane, butyl triethoxy silane, phenyl triethoxy silane, ethyl triisopropoxy silane, vinyl tributoxy silane, ethyl silicate, butyl silicate and methyl triaryloxy silane.

11. The method of (co)polymerization of ethylene according to claim 2, wherein the titanium compound is represented by a general formula of $Ti(OR)_a X_{4-a}$, wherein R is a hydrocarbon group, X is a halogen atom and a is an integer of $0 \leq a \leq 4$ and wherein the haloalkane compound is a compound comprising at least one halogen atom and 1 to 20 carbon atoms, or mixtures thereof.

12. The method of (co)polymerization of ethylene according to claim 11, wherein the titanium compound is selected from the group consisting of $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_9))Br_3$, $Ti(OCH_3)_2Cl_2$, $Ti(OC_2H_5)_2Cl_2$, $Ti(O(i-C_4H_9))_2Cl_2$, $Ti(OC_2H_5)_2Br_2$, $Ti(OCH_3)_4$, $Ti(OC_2H_5)_4$ and $Ti(OC_4H_9)_4$, and wherein the haloalkane compound is selected from the group consisting of monochloromethane, dichloromethane, trichloromethane, tetrachloromethane, monochloroethane, 1,2-dichloroethane, monochloropropane, monochlorobutane, monochloro-sec-butane, monochloro-tert-butane, monochlorocyclohexane, monobromomethane, monobromopropane, monobromobutane and monoiodomethane.

13. The method of (co)polymerization according to claim 2, wherein the aluminum compound is a compound represented by the general formula of $R_n AlX_{3-n}$, wherein R is alkyl group having 1 to 20 carbon atoms, X is halogen atom or hydride, and n is 1, 2 or 3, or mixtures thereof.

14. The method of (co)polymerization according to claim 2, wherein the organometallic compounds in Group II or III of the Periodic Table are represented by the general formula of $MR_n$, wherein M is a metal component selected from the group consisting of magnesium, calcium, zinc, boron, aluminum and gallium, R is an alkyl group having 1 to 20 carbon atoms; and n is the valence of the metal component.

* * * * *